UNITED STATES PATENT OFFICE.

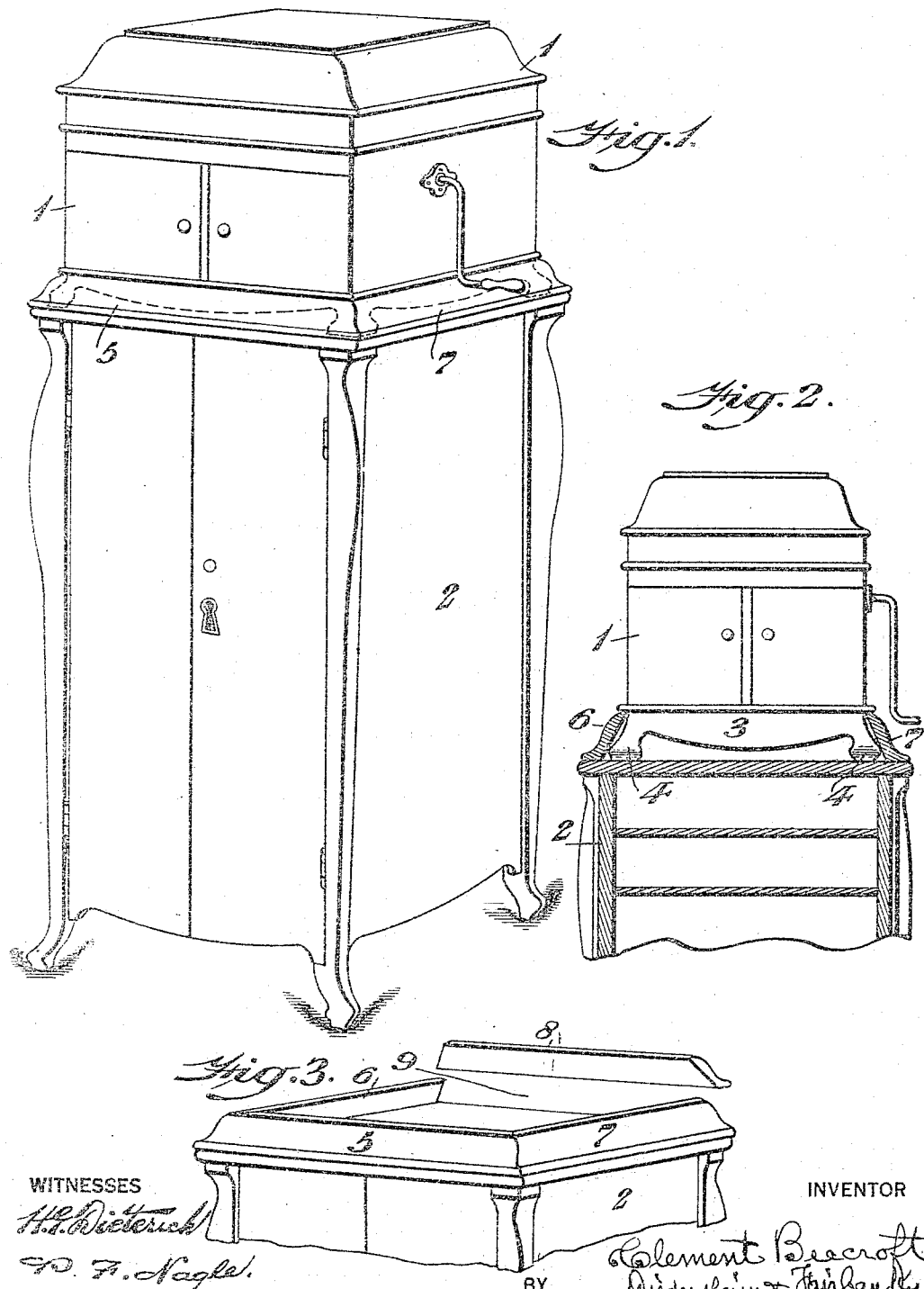

CLEMENT BEECROFT, OF PHILADELPHIA, PENNSYLVANIA.

CABINET FOR TALKING-MACHINES.

1,244,944.      Specification of Letters Patent.      Patented Oct. 30, 1917.

Application filed May 27, 1915. Serial No. 30,731.

*To all whom it may concern:*

Be it known that I, CLEMENT BEECROFT, a citizen of the United States, residing in the city and county of Philadelphia, State of Pennsylvania, have invented a new and useful Cabinet for Talking-Machines, of which the following is a specification.

My invention consists in providing the record cabinet of a talking machine with means for controlling the latter on said cabinet so that it may remain to all intents and purposes a fixture of the cabinet, and the cabinet and talking machine may be moved as one without liability of the machine being removed from the cabinet, and the machine cannot be displaced from its position on the cabinet in handling or operating the same.

The invention is satisfactorily illustrated in the accompanying drawing, but the important instrumentalities thereof may be varied, as long as they are included in the scope of the claims.

Figure 1 represents a perspective view of a cabinet for a talking machine embodying my invention including such machine thereon.

Fig. 2 represents a vertical section of a portion thereof including a front elevation of the talking machine thereon.

Fig. 3 represents a perspective view of a portion of the cabinet.

Similar numerals of reference indicate corresponding parts in the figures.

Referring to the drawings.

1 designates the casing of a talking machine known as such, and 2 designates the record cabinet on the top of which said casing is imposed and supported, said casing having on the corners of its base 3 the legs 4 which rest on said top.

In order to secure said casing to said cabinet and prevent displacement thereof I secure to the top of the latter a frame composed of the cleats 5, 6, 7 and 8 which rise respectively from the several sides thereof, the cleats 5, 6, and 7 being primarily fixed to the cabinet, and the remaining cleat 8 being primarily separated therefrom forming a gate for the opening 9 in a side of the frame, but which is closed when said cleat 8 is in position in said opening.

The cleats are adapted to incline inwardly whereby when the separated cleat 8 is removed, the casing 1 may be placed upon the cabinet, its base portion and legs sliding or passing under the side cleats 6 and 7 and entering under the front cleat 5. Then the cleat 8 is applied in position and secured, when as will be seen it preserves the continuity of the several cleats and the casing is interlocked with the cabinet by the several cleats and so retained on the cabinet that it cannot shift thereon in any lateral directions. Furthermore, as the cleats incline inwardly and overhang the base and legs of the casing, they form dovetailed joints with said base and legs and so prevent the casing from being raised from the cabinet. Then the molding on the sides of the casing of the machine is adapted to be seated on the tops of the cleats and serve additionally to steady the casing most firmly on said cleats, and consequently on the top of the cabinet, an important feature for a talking machine.

Should it be desired to remove the machine from the cabinet, the cleat 8 is disconnected from the cabinet whereby the opening 9 is uncovered and so the machine may be slidingly moved on the top of the cabinet through said opening and disengaged from the cleats 5, 6, and 7 without disturbing the other cleats.

Having thus described my invention what I claim as new and desire to secure by Letters Patent, is:—

1. A cabinet for a talking machine having a top on which the casing of the machine is adapted to be supported, an inclosure rising from said top, and formed of cleats which are adapted to engage the sides of the base, certain of the cleats being fixed to said top and another cleat forming a gate for entrance into the space of the inclosure, and means for holding the gate in closed position and permitting its opening.

2. A cabinet for a talking machine having a top on which the casing of the machine is adapted to be supported, cleats rising from said top forming an inclosure for the sides of the base of said machine and adapted to interlock therewith, one of said cleats being separate from the other cleats and movable forming a gate for the insertion of said base into the space of said inclosure, the inner sides of the cleats overhanging so as to form interlocking joints with said base.

CLEMENT BEECROFT.

Witnesses:
JOHN A. WIEDERSHEIM,
N. BUSSINGER.